United States Patent
Yezersky et al.

(10) Patent No.: US 12,208,814 B2
(45) Date of Patent: Jan. 28, 2025

(54) SENSOR PERFORMANCE VALIDATION IN ADVANCED DRIVER-ASSISTANCE SYSTEM VERIFICATION

(71) Applicant: ZF FRIEDRICHSHAFEN AG, Friedrichshafen (DE)

(72) Inventors: Grigory Yezersky, Farmington Hills, MI (US); Gahl Berkooz, Ann Arbor, MI (US); Michael Diaz, Ann Arbor, MI (US); David Wilson, Milford, MI (US)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 726 days.

(21) Appl. No.: 17/345,203

(22) Filed: Jun. 11, 2021

(65) Prior Publication Data
US 2022/0396278 A1    Dec. 15, 2022

(51) Int. Cl.
| | |
|---|---|
| *G06V 20/56* | (2022.01) |
| *B60W 50/04* | (2006.01) |
| *G06N 3/08* | (2023.01) |
| *G06T 3/00* | (2006.01) |
| *G06V 10/776* | (2022.01) |

(52) U.S. Cl.
CPC ............. *B60W 50/045* (2013.01); *G06N 3/08* (2013.01); *G06T 3/00* (2013.01); *G06V 10/776* (2022.01); *G06V 20/56* (2022.01); *B60W 2050/046* (2013.01); *B60W 2420/403* (2013.01); *B60W 2554/4048* (2020.02)

(58) Field of Classification Search
CPC ........ G06T 3/00; G06V 10/776; G06V 20/56; B60W 50/045; B60W 2050/046; B60W 2420/403; B60W 2554/4048; G06F 18/214; G06N 3/08; G06N 3/045; G01S 17/86; G01S 7/40; G01S 7/417; G01S 7/497; G01S 13/931; G01S 17/931
See application file for complete search history.

(56) References Cited

U.S. PATENT DOCUMENTS

| | | | | |
|---|---|---|---|---|
| 10,228,693 B2 * | 3/2019 | Micks | .................. | G05D 1/0274 |
| 2021/0018589 A1 * | 1/2021 | Berkooz | .............. | G06V 10/147 |

OTHER PUBLICATIONS

Hober et al. "Phenomenological Modelling of Lane Detection Sensors for Validating Performance of Lane Keeping Assist Systems." IEEE Intelligent Vehicles Symposium, Oct. 19, 2020, pp. 899-905 (Year: 2020).*

Muckenhuber et al. "Object-Based Sensor Model for Virtual Testing of ADAS/AD Functions." IEEE International Conference on Connected Vehicles and Expo (ICCVE), Nov. 4, 2019, 6 pages (Year: 2019).*

* cited by examiner

*Primary Examiner* — Jon Chang
(74) *Attorney, Agent, or Firm* — Tarolli, Sundheim, Covell & Tummino LLP

(57) ABSTRACT

Systems and methods are provided for generating data for sensor system validation. A representative vehicle is equipped with a set of sensors positioned to provide a collective field of view defining a set of sensor locations as a set of master data and encompassing a field of view of a sensor positioned at any of the set of sensor locations. The set of sensor locations includes a sensor location at which no sensor of the set of sensors is placed. The representative vehicle is driven for a distance required for validation of a sensor system to provide master data representing the entire distance required for validation.

11 Claims, 5 Drawing Sheets

SENSOR PERFORMANCE VALIDATION IN ADVANCED DRIVER-ASSISTANCE SYSTEM VERIFICATION

TECHNICAL FIELD

This invention relates to advanced driver-assistance systems, and more particularly, to sensor calibration in advanced driver-assistance system verification.

BACKGROUND

To validate the performance of an advanced driver-assistance system (ADAS) or its components, the customer (an original equipment manufacturer) can require from a producer of the system or its components to drive the vehicle for up to a million kilometers. The cost of this validation is on the order of eight EURO per kilometer, representing a significant expense for manufacturers and suppliers that may have many programs to be validated in a year. Further, every time there is a change in the sensor or the location of the sensor, the vehicle needs to be driven again to validate the ADAS system. A computer can be used to generate photorealistic scenes that include vehicles, roads, trees, people, atmospheric conditions, and lighting conditions, with this synthetically generated scene as input into a Hardware In the Loop (HIL) ADAS lab bench to simulate the visual input and validate the systems performance. For some applications, however, this method is insufficient because the sensors were not stimulated with "real miles" and there is an unquantifiable doubt regarding whether the system response would be different had it been stimulated with "real miles."

SUMMARY

In accordance with a first example, a system for sensor performance validation includes a set of sensors positioned on a representative vehicle to provide a collective field of view defining a set of sensor locations, such that a field of view of a sensor positioned at any of the set of sensor locations is encompassed by the collective field of view of the sensor. The first set of sensors provides a set of master data. The set of sensor locations includes at least one sensor location at which no sensor of the set of sensors is placed. A validation data generator is configured to generate, from the master data, a transform function that can be applied to the master data to provide data representing a field of view associated with any of the set of sensor locations.

In accordance with a second example, a method is provided for generating a master data set representing a set of vehicle models for vehicle sensor performance validation. A set of sensor locations associated with the set of vehicle models are determined, and a field of view for each of the set of sensor locations is determined in a reference coordinate field associated with a representative vehicle selected from the set of vehicle models to provide a set of sensor fields of view. A collective field of view for the set of sensor locations is determined in the reference coordinate system from the set of sensor fields of view. The representative vehicle is equipped with a set of sensors, positioned such that the fields of view associated with the set of sensors, once combined, encompass the determined collective field of view. The representative vehicle is driven for a distance required for validation of a sensor system to provide the master data set, such that the master data set contains data representing the entire distance required for validation across the determined collective field of view. The master data set is stored on a non-transitory computer readable medium.

In accordance with a third example, a method is provided for generating sensor validation data. A representative vehicle is equipped with a first set of sensors positioned to provide a collective field of view defining a set of sensor locations as a set of master data. The first set of sensors are positioned such that a field of view of a sensor positioned at any of the set of sensor locations is encompassed by the collective field of view of the sensor. The set of sensor locations includes at least one sensor location at which no sensor of the first set of sensors and the second set of sensors is placed. Vehicle metadata, representing outputs of at least one vehicle system, is received. The representative vehicle is driven for a distance required for validation of a sensor system, such that each of the set of master data and vehicle metadata contain data representing the entire distance required for validation. A machine learning model is trained on the set of master data and the vehicle metadata to provide a transform function that can be applied to the master data to provide data representing a field of view associated with any of the set of sensor locations.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

Figure 1:
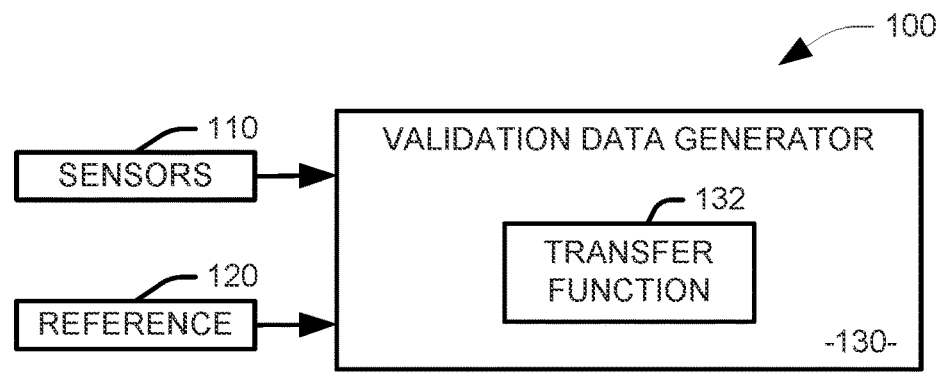
FIG. 1 illustrates one example of a system for providing validation data for an ADAS system.

In the context of the present disclosure, the singular forms "a," "an" and "the" can also include the plural forms, unless the context clearly indicates otherwise. The terms "comprises" and/or "comprising," as used herein, can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

Additionally, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "transform function" can refer to an algorithmic process that models an output of a functional module for each possible input. In one example used herein, a transform function can receive a two-dimensional frame of output from a first sensor or first set of sensors as well as coordinates representing a position of a second sensor and produce an output that represents a field of view for the second sensor.

The term "sensor" can refer to a device configured to produce an image based on received electromagnetic radiation. A sensor can operate solely on ambient radiation or can include a transmitter that projects electromagnetic radiation into a region of interest to facilities imaging. Examples of sensors can include cameras operating in the visible light and infrared range as well as radar and lidar systems.

As used herein, the term "substantially identical" refers to articles or metrics that are identical other than manufacturing or calibration tolerances.

As used herein, "substantially synchronized" means that two signals or events are intended to be initiated at a same time, with any difference in the time of initiation being no more than what would be caused by differences in signal transmission paths.

The term "coordinate system" can refer to a system of representing points in a space of given dimensions by coordinates.

Given the expense of validating new vehicles and sensor systems, the systems and methods provided herein provide a method that allows for generation of a master data set for use in validating a set of vehicles that can be represented by a selected representative vehicle. Specifically, the representative vehicle can be outfitted with a set of sensors to obtain a master data set that covers substantially all of the field of view that would be expected for sensors in varying locations within the set of vehicles. A reference sensor can be positioned to collect reference data, and a machine learning model can be trained to produce data representing a field of view from an arbitrarily placed sensor within the field of view represented by the master data set. Accordingly, validation data can quickly be generated for a sensor implemented on a new vehicle or at a new position on an existing vehicle.

FIG. 1 illustrates one example of a system 100 for providing validation data for an ADAS system. The system 100 includes a set of sensors 110 positioned on a representative vehicle as to provide an expansive collective field of view from the vehicle. Specifically, the field of view is intended to encompass the field of view for a sensor placed at any of a set of predetermined sensor locations, which can be selected to include expected placements for sensors on the representative vehicle as well as other vehicles in a set of vehicles represented by the representative vehicle. In one example, the representative vehicle may represent a class of vehicles such as sedans, sports utility vehicles, or pickup trucks. It will be appreciated, however, that the representative vehicle need merely encompass the field of view for all likely sensor locations on the set of vehicles, and that a given vehicle in the set of vehicles can be facially very different from the representative vehicle so long as the set of sensors 110 can be placed on the representative vehicle as to cover the equivalent field of view for that vehicle. The set of sensors 110 collectively provide a set of master data.

Figure 2:
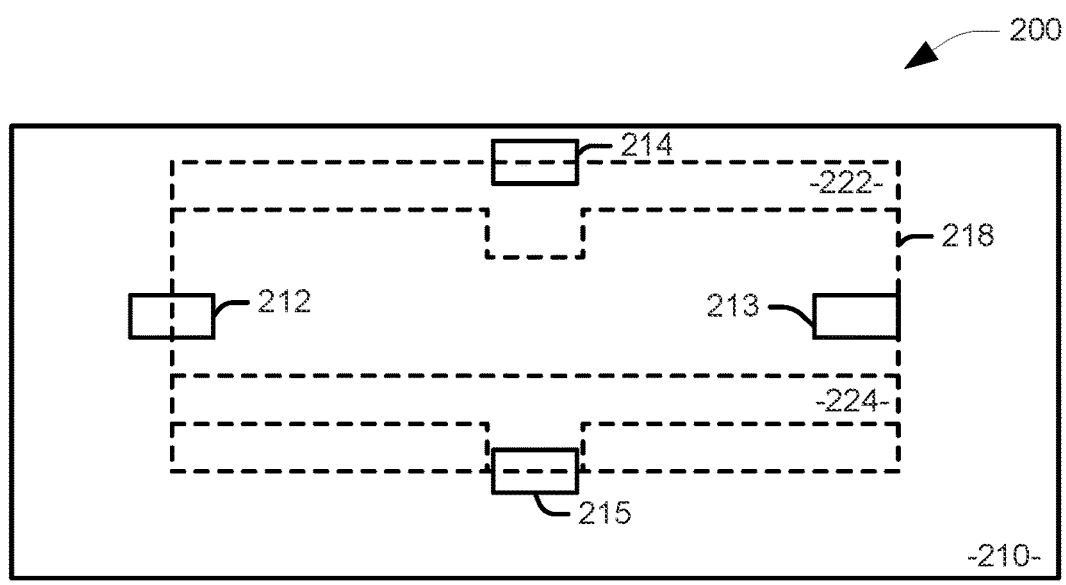
FIG. 2 illustrates one possible sensor placement in an example implementation of the first set of sensors on a windshield of a representative vehicle.

FIG. 2 illustrates one possible sensor placement 200 in an example implementation of the set of sensors 110 on a windshield 210 of a representative vehicle. In the illustrated example 200, the set of sensors includes four sensors, 212-215 that are placed on the edges of a rectangular field 218 representing existing and expected sensor mounting locations for vehicles within a same class as the representative vehicle. In one example, the sensors 212-215 can be placed at the midpoint of each edge. An upper portion 222 of the rectangular field 218 can represent existing and expected sensor locations for the largest vehicles in the class associated with the representative vehicle, and a lower portion 224 of the rectangular field can represent existing and expected sensor locations for the smallest vehicles in the class associated with the representative vehicle.

First and second sensors 212 and 213 are placed in positions at or just outside of the horizontal edges of the rectangular field 218. It will be appreciated that the placement of the first and second sensors 212 and 213 may be asymmetric, as the sensor on the driver's side 213 can be aligned more directly with the edge of the field to avoid obstructing a view of the driver. A third sensor 214 is positioned at the top edge of the rectangular field 218, and a fourth sensor 215 is positioned at the bottom edge of the rectangular field. It will be appreciated that, taken in combination, the four sensors 212-215 provide a field of view that encompasses the field of view of any sensor within the rectangular field 218.

Returning to FIG. 1, a reference sensor 120 is positioned at a selected sensor location within the set of sensor locations. For example, the reference sensor 120 can be positioned within the rectangular field defined in FIG. 2 to provide a set of reference data for the selected sensor location. In one implementation, a common clock signal to each sensor of the first set of sensors 110 and each sensor of the reference 120, such that the outputs of the first set of sensors and the reference sensor are synchronized. This ensures that capture of the images among the first set of sensors is substantially synchronized and that the data received at corresponding image frames at each sensor represents a same scene from the representative vehicle.

A validation data generator 130 is configured to generate a transform function 132 from at least the master data. In the illustrated implementation, the validation data generator 130 can be implemented as dedicated hardware (e.g., an application-specific integrated circuit or a field programmable gate array), as software instructions executed by an associated processor, or as a combination of software and dedicated hardware. The transform function can be made adaptable to provide an output representing a field of view for a sensor located anywhere within the set of sensor locations. Specifically, the transform function 132 can receive an input representing a position of a sensor within the defined set of sensor positions and the master data collected by the set of sensors 110 and provide an output representing a field of view associated with any of the set of sensor locations. It will be appreciated that the set of sensor locations includes at least one sensor location at which no sensor of the set of sensors 110 and the reference sensor 120 is placed. Accordingly, the transform function 132 is generalizable to locations within the set of sensor locations for which no data was collected.

In one example, the validation data generator 130 can include a machine learning model that is trained on the data captured at the set of sensors 110, and in some implementations, the reference sensor 120. In one example, the machine learning model 132 can be implemented as an artificial neural network, such as a convolutional neural network, a recurrent neural network, a generalized adversarial network, or a variational autoencoder. In one example, the reference sensor 120 provides an object list associated with each frame, and the machine learning model 132 is trained on the image frames output from the set of sensors 110 and the object list. In one implementation, the image frames from the set of sensors 110 can be provided to the machine learning model 132 as raw images to avoid any loss of information that might occur during preprocessing operations.

Figure 3:
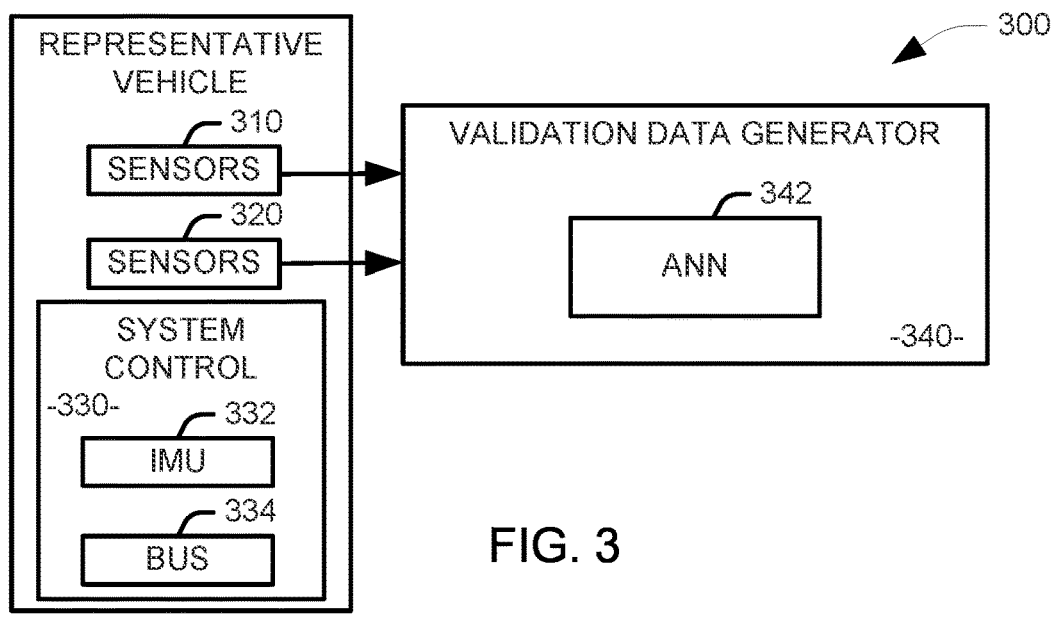
FIG. 3 illustrates another example of a system for providing validation data for an ADAS system, and more specifically, for a sensor system associated with a vehicle within a set of vehicles represented by a representative vehicle.

FIG. 3 illustrates another example of a system 300 for providing validation data for an ADAS system, and more specifically, for a sensor system associated with a vehicle within a set of vehicles represented by a representative vehicle 304. In particular, a first set of sensors 310 is configured to provide an expansive field of view from the representative vehicle 304, specifically a field of view that encompasses the field of view of a sensor located at any of a plurality of defined sensor locations. The sensor locations can be selected to cover existing or expected locations of sensors across a set of vehicles to which the representative vehicle belongs. In practice, the representative vehicle 304 can be selected to be a mid-sized vehicle with the represented set, with the set of sensor locations selected to represent vehicles both larger and smaller than the representative vehicle.

A second set of sensors 320 are placed at locations within the set of sensor locations to collect reference data for their respective locations. It will be appreciated that the second set of sensors 320 are not placed at every location of the set of sensor locations, and thus there will be sensor locations within the set of sensor locations for which reference data is not collected. It will be appreciated that the second set of sensors 320 are not necessary for the collection of master data and can be added to the representative vehicle 304 during a validation process of the transform function. The validation process occurs after the master data set is collected. A system control 330 is configured to provide a common initialization signal to each sensor of the first set of sensors 310 and each sensor of the second set of sensors 320, such that the outputs of the first set of sensors and the second set of sensors are synchronized. As a result, the output of corresponding image frames from each sensor of the two sets of sensors 310 and 320 should represent a same position along a travel path of the representative vehicle 304.

It will be appreciated that various vehicles can have different dynamics during operation, due to differences both in the mechanical operation of the vehicle and, potentially, the route travelled by the vehicle during validation. While the first and second sets of sensors 310 and 320 can be mounted with mechanical dampening the reduce these effects, the representative vehicle 304 can include a set of kinematic sensors, illustrated in FIG. 3 as an inertial measurement unit (IMU) 332 at the system control 330, that generates data on vehicle dynamics while data is collected at the first and second set of sensors 310 and 320. The system control 330 can also include a bus interface 334 that receives vehicle metadata from various systems within the representative vehicle 304. Vehicle metadata can include, for example, any or all of a steering angle, vehicle speed, GPS location, current time, headlamp status, wiper status, or turn signal status. In some implementations, the output of the IMU 332 and the vehicle metadata can be used to apply a correction to the set of master data and the sets of reference data based on the motion of the representative vehicle.

The representative vehicle 304 can be driven with the first set of sensors 310 and the second set of sensors 320 in place for a distance required to validate the new sensor system to produce a set of master data from the first set of sensors 310 and a plurality of sets of reference data from the second set of sensors 320. The master data and the reference data can be provided to a validation data generator 340 to provide a general transform function for providing output appropriate for a camera at any of the set of sensor locations. While the validation data generator 340 is shown as a set of functional blocks, it will be appreciated that, in practice, the validation data generator can be implemented as a computer system comprising a non-transitory memory and a processor, with the non-transitory memory to storing data and computer-executable instructions and the processor executing the computer-executable instructions to facilitate the performance of operations and/or implement the functions of one or more of components of the system. The validation data generator can be a general purpose computer, special purpose computer, and/or other programmable data processing apparatus. The non-transitory memory can be an electronic, magnetic, optical, electromagnetic, infrared, semiconductor system, apparatus or device, a portable computer diskette, a random access memory, a read-only memory; an erasable programmable read-only memory (or Flash memory), or a portable compact disc read-only memory. It will be appreciated that the validation data generator can incorporate multiple devices, with multiple processors and memories (not shown), and can be implemented at the representative vehicle 304 or on a computer system external to the representative vehicle.

Since both sets of data are collected simultaneously from sensors that are synchronized via a common initialization signal, it will be appreciated that the images comprising the set of master data will have corresponding images in the set of reference data that were captured at the same time and represent a same location along the path of the representative vehicle. An artificial neural network (ANN) 342 is trained on the master data and, optionally, either or both of the vehicle metadata and a portion of the reference data to provide a generalized image transform function between the master data and an arbitrarily selected location within the set of sensor locations. In the illustrated example, the master data and the vehicle metadata are employed in the training process. It will be appreciated that the image transform function may be provided explicitly as a mathematical expression, or implicitly in the form of the internal parameters, such as link weights between neurons, of the artificial neural network. In one example, images or video frames from the set of master data are provided as an input to the system along with a positon of a given sensor of the second set of sensors, with the corresponding images or frames from the given sensor used as an exemplary output for the training process. In one example, the artificial neural network 342 is implemented as a convolutional neural network (CNN). A CNN is a type of artificial neural network that is generally not fully connected between layers, for example, a given input node may be connected to only a proper subset of the nodes in a hidden layer. This partial connection allows the CNN to learn various convolutional kernels that operate much like the kernels used in image filtering. These learned kernels effectively operate as the features for discriminating among classes, and as a result, the input into the CNN is generally the raw chromatic values for the pixels comprising the image.

Once the artificial neural network 342 is trained, images from the set of master data and a selected camera location within the set of camera locations can be provided to the artificial neural network to subject the set of master data to the image transform function. The images output from the artificial neural network 342 in response to these images can be saved as a set of transformed validation data, which can be applied to validate the new sensor system and any associated ADAS. In one implementation, a vehicle other than the representative vehicle can be driven with the new sensor system and a set of sensors configured in the same manner as the first set of sensors 310 can be driven for a distance less than that necessary to validate the sensor data. The output of the set of sensors configured in the same manner as the first set of sensors 310 can be subjected to the transform function to provide validation data that represents the location of the new sensor system. The output of the new sensor system can be compared to this validation data to ensure that the transform function is properly representing the location of the new sensor system on the new vehicle to provide an error value representing the difference between the two sets of data. The new sensor system can be validated using a full set of validation data generated from the set of master data and the transform function if the error value meets a predefined threshold.

Figure 4:
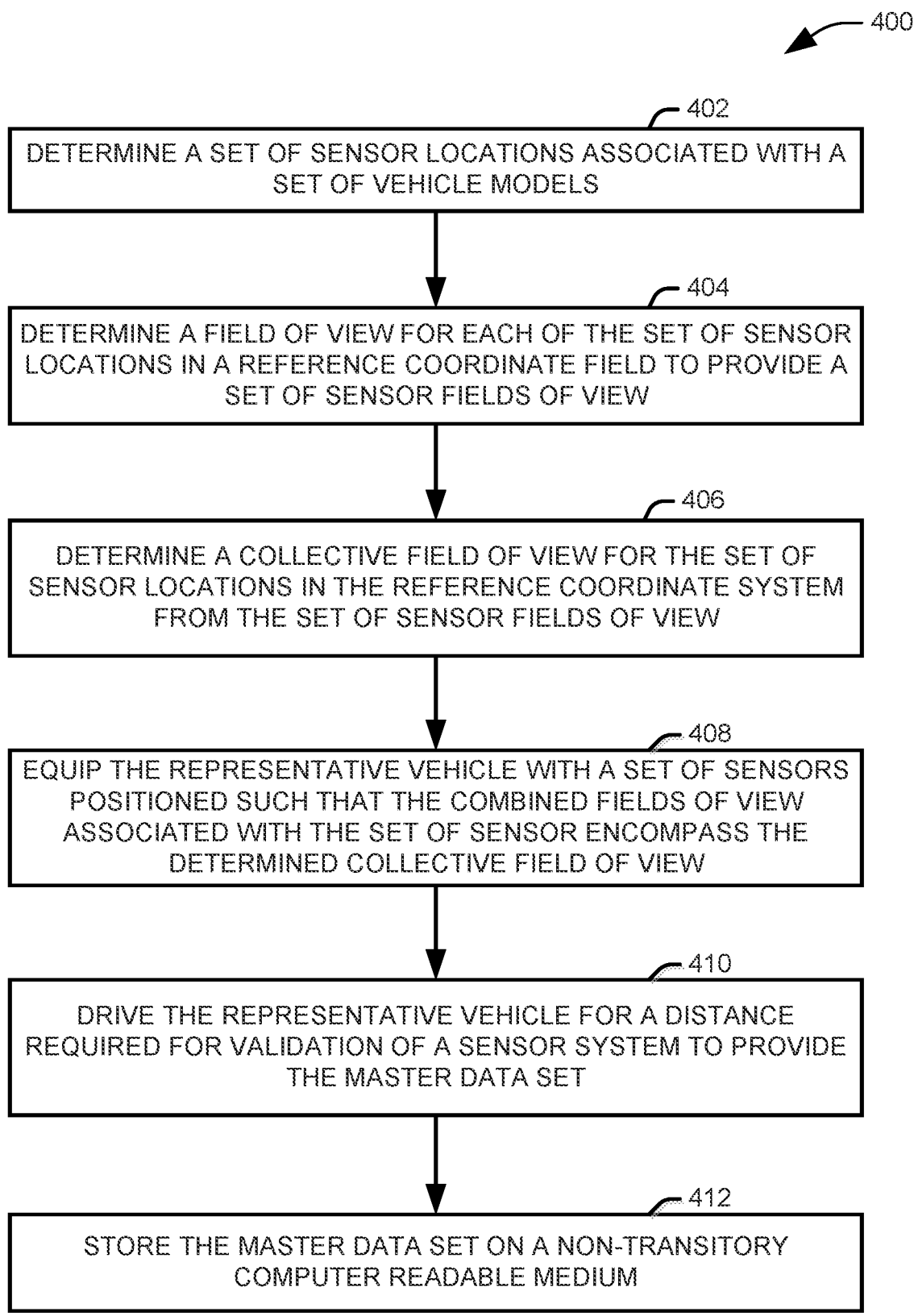
FIG. 4 illustrates one example of a method for generating a master data set for sensor validation.
Figure 5:
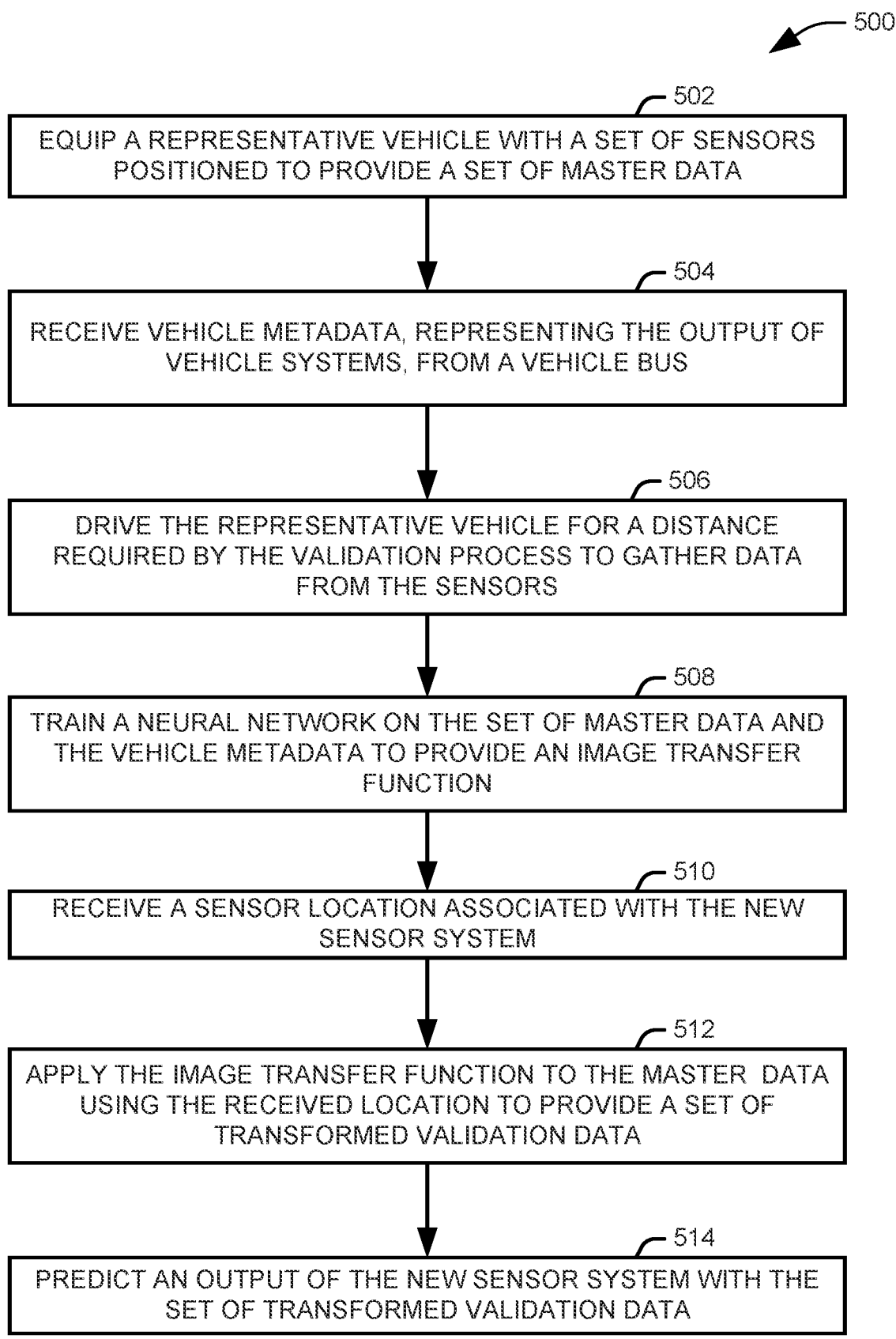
FIG. 5 illustrates one example of a method for generating a data set for validating a sensor system at a specific location.
Figure 6:
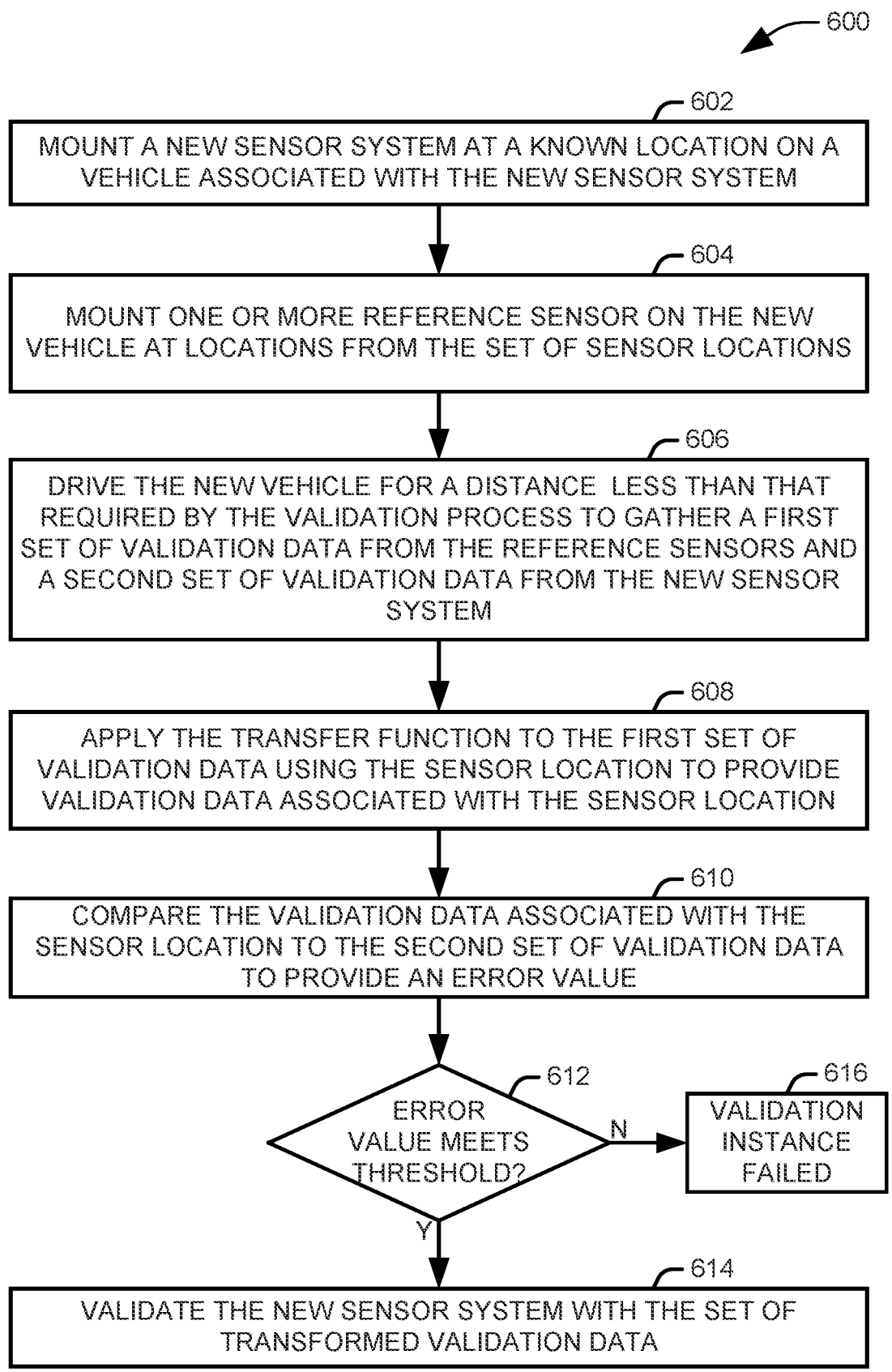
FIG. 6 illustrates a method for validating a new sensor system with a set of transformed validation data.

In view of the foregoing structural and functional features described above, a method in accordance with various aspects of the present invention will be better appreciated with reference to FIGS. 4-6. While, for purposes of simplicity of explanation, the methods of FIGS. 4-6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

One or more blocks of the flowchart illustrations, and combinations of blocks in the block flowchart illustrations, can be implemented by computer program instructions. These computer program instructions can be stored in memory and provided to a processor of a general purpose computer, special purpose computer, and/or other programmable data processing apparatus to produce a machine, such that the instructions, which execute via the processor of the computer and/or other programmable data processing apparatus, create mechanisms for implementing the steps/acts specified in the flowchart blocks and/or the associated description. In other words, the steps/acts can be implemented by a system comprising a processor that can access the computer-executable instructions that are stored in a non-transitory memory.

The methods can be implemented in hardware and/or in software (including firmware, resident software, microcode, etc.). Furthermore, aspects of the present disclosure may take the form of a computer program product on a computer-usable or computer-readable storage medium having computer-usable or computer-readable program code embodied in the medium for use by or in connection with an instruction execution system. A computer-usable or computer-readable medium may be any non-transitory medium that can contain or store the program for use by or in connection with the instruction or execution of a system, apparatus, or device. As an example, executable code for performing the methods can be stored in a non-transitory memory of a computing device and executed by a processor of the computing device and/or another computing device.

FIG. 4 illustrates one example of a method 400 for generating a master data set for sensor validation. At 402, a set of sensor locations associated with the set of vehicle models is determined. In one implementation, the set of vehicle models is selected as a set of vehicles currently equipped with sensors at known sensor locations in which no two vehicles within the set of vehicles have sensors with respective sensor locations within the reference coordinate system that differ by more than a threshold amount. The representative vehicle can then be selected from the set of vehicle models, generally as a car that is roughly average in size among the set of vehicle models. It will be appreciated that the set of sensor locations can represent both sensors currently equipped on each of the vehicle models and predictions of the locations of sensors expected to be included on one of the set of vehicle models at a future time.

At 404, a field of view for each of the set of sensor locations is determined in a reference coordinate system associated with the representative vehicle to provide a set of sensor fields of view. At 406, a collective field of view for the set of sensor locations is determined in the reference coordinate system from the set of sensor fields of view. At 408, the representative vehicle is equipped with a set of sensors, positioned such that the fields of view associated with the set of sensors, once combined, encompass the determined collective field of view of the set of sensor locations. In one example, the position of each sensor of the set of sensors is selected such that a number of sensors in the set of sensors necessary to encompass the determined collective field of view of the set of sensor locations is minimized. A common initialization signal can be provided to each sensor of the set of sensors, such that the outputs of the set of sensors are synchronized.

At 410, the representative vehicle is driven for a distance required for validation of a sensor system to provide the master data set, such that the master data set contains data representing the entire distance required for validation across the determined collective field of view. In one example, vehicle metadata is also collected, via a vehicle bus, as the vehicle is driven. The vehicle metadata can represent, for example, any or all of a steering angle, a GPS location, vehicle speed, headlamp status, wiper status, or turn signal status of the representative vehicle. The master data set is stored on a non-transitory computer readable medium at 412.

At 404, the representative vehicle is equipped with a second set of sensors, each positioned at a selected sensor location within the set of sensor locations and providing a set of reference data for the selected sensor location. It will be appreciated that not all of the set of sensor locations will be represented and will include at least one sensor location at which no sensor of the first set of sensors and the second set of sensors is placed. In one implementation, a common initialization signal is provided to each sensor of the first set of sensors and each sensor of the second set of sensors, such that the outputs of the first set of sensors and the second set of sensors are synchronized. At 406, the representative vehicle is driven for a distance required for validation of a sensor system, such that each of the set of master data and the sets of reference data contain data representing the entire distance required for validation.

FIG. 5 illustrates one example of a method 500 for generating a data set for validating a sensor system at a specific location. At 502, a representative vehicle is equipped with a set of sensors positioned to provide a set of master data. Specifically, a collective field of view of the set of sensors defines a set of sensor locations, such that a field of view of a sensor positioned at any of the set of sensor locations is encompassed by the collective field of view of the sensor. In one implementation, a common initialization signal is provided to each sensor of the set of sensors, such that the outputs of the set of sensors are synchronized. At 504, a set of vehicle metadata, representing the output of one or more vehicle systems are received, for example, via a vehicle bus associated with the representative vehicle. The metadata can include, for example, a steering angle, vehicle speed, GPS location, current time, headlamp status, wiper status, or turn signal status.

At 506, the representative vehicle is driven for a distance required for validation of a sensor system, such that each of the set of master data and the vehicle metadata contain data representing the entire distance required for validation. At 508, a machine learning model is trained on the set of master data and the vehicle metadata to provide a transform function that can be applied to the master data to provide data representing a field of view associated with any of the set of sensor locations. In one implementation, the machine learning model is implemented as a convolutional neural network. At 510, a sensor location of the set of sensor locations associated with a new sensor system is received. It will be appreciated that the sensor location can be defined relative to a coordinate system associated with the first set of sensors. At 512, the transform function is applied to the master data to produce a set of transformed validation data associated with the received sensor location. At 514, an output of the new sensor system is predicted with the set of transformed validation data.

FIG. 6 illustrates a method 600 for validating a new sensor system with a set of transformed validation data. At 602, the new sensor system is mounted at a known location on a new vehicle associated with the new sensor system. By a "known location", it is meant that the location of the sensor on the new vehicle is known in a coordinate system associated with the set of sensors on the representative vehicle. At 604, each of at least one reference sensor is mounted on the new vehicle at one of the set of sensor locations defined by the set of master sensors. Accordingly, the output of the at least one reference sensor when the new vehicle is driven along a given route should be selected to have a field of view within the field of view associated equivalent to what the first set of sensors would record when driven along the route.

At 606, the new vehicle for a distance less than the distance required for validation to provide a first set of validation data from the at least one reference sensors and a second set of validation data from the new sensor system. At 608, the transform function established at the representative vehicle is applied to the first set of validation data to provide validation data associated with the known sensor location. For example, where the transform function is embodied in a machine learning model, each of the first set of validation data and the known location can be input to the machine learning model to produce validation data associated with the known location.

At 610, the second set of validation data is compared to the validation data associated with the known sensor location to provide an error value. For example, a set of corresponding frames of data can be selected from each set of validation data and a pixel-by-pixel subtraction can be performed across the chromaticity values (e.g., grayscale values, RGB values, luma-chroma values, etc.). The difference values for each frame can be summed and a representative value for the differences across all frames, such as a sum or measure of central tendency (e.g., arithmetic mean or median) can be computed. Alternatively, each of the second set of validation data and the validation data associated with the known sensor location can be generated as an object list, representing the location and identity of objects in the field of view, and the error value can be generated by comparing these object lists. The error value is compared to a threshold at 612. If the error value meets the threshold (Y), the new sensor system is validated at 614 with the set of transformed validation data produced using master data from the representative vehicle. Otherwise (N), the method advances to 616, where this instance of the validation process is determined to have failed and a user can be notified to adjust the validation process, for example, by changing the locations of the reference sensors, or find an alternative means for validating the new sensor system.

Figure 7:
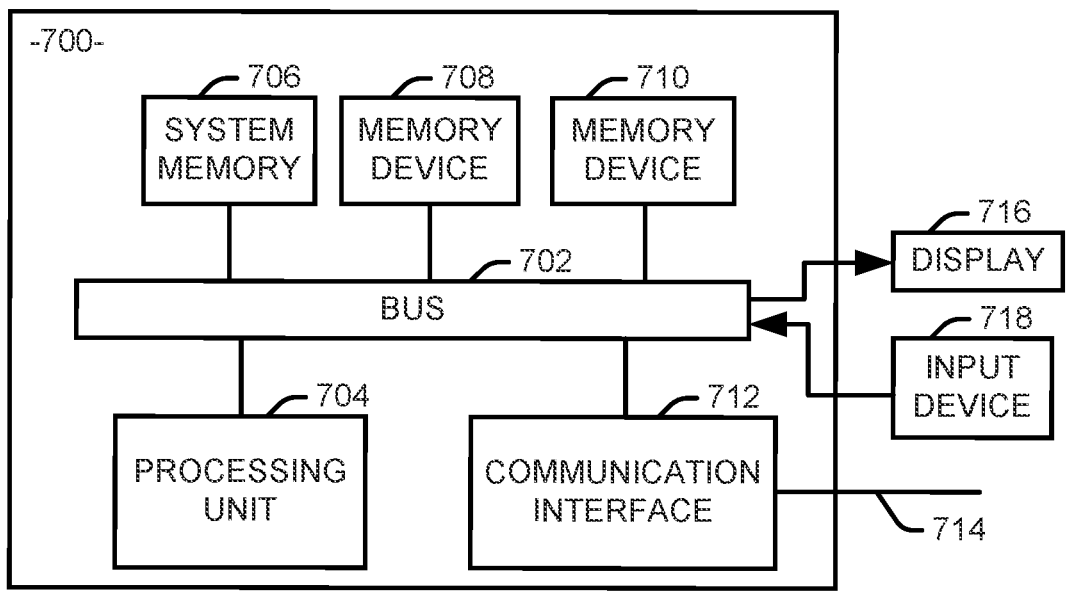
FIG. 7 is a schematic block diagram illustrating an exemplary system of hardware components capable of implementing examples of the system disclosed in FIGS. 1-6.

FIG. 7 is a schematic block diagram illustrating an exemplary system 700 of hardware components capable of implementing examples of the system disclosed in FIGS. 1-6, for example, the validation data generator 130 of FIG. 1. The system 700 can include various systems and subsystems. The system 700 can be a personal computer, a laptop computer, a workstation, a computer system, an appliance, an application-specific integrated circuit (ASIC), a server, a server blade center, a server farm, etc.

The system 700 can include a system bus 702, a processing unit 704, a system memory 706, memory devices 708 and 710, a communication interface 712 (e.g., a network interface), a communication link 714, a display 716 (e.g., a video screen), and an input device 718 (e.g., a keyboard and/or a mouse). The system bus 702 can be in communication with the processing unit 704 and the system memory 706. The additional memory devices 708 and 710, such as a hard disk drive, server, stand alone database, or other non-volatile memory, can also be in communication with the system bus 702. The system bus 702 interconnects the processing unit 704, the memory devices 706-710, the communication interface 712, the display 716, and the input device 718. In some examples, the system bus 702 also interconnects an additional port (not shown), such as a universal serial bus (USB) port.

The processing unit 704 can be a computing device and can include an application-specific integrated circuit (ASIC). The processing unit 704 executes a set of instructions to implement the operations of examples disclosed herein. The processing unit can include a processing core.

The additional memory devices 706, 708 and 710 can store data, programs, instructions, database queries in text or compiled form, and any other information that can be needed to operate a computer. The memories 706, 708 and 710 can be implemented as computer-readable media (integrated or removable) such as a memory card, disk drive, compact disk (CD), or server accessible over a network. In certain examples, the memories 706, 708 and 710 can comprise text, images, video, and/or audio, portions of which can be available in formats comprehensible to human beings.

Additionally or alternatively, the system 700 can access an external data source or query source through the communication interface 712, which can communicate with the system bus 702 and the communication link 714.

In operation, the system 700 can be used to implement one or more parts of a system or method for generating validation data for an advanced driver-assistance system (ADAS) or validating the ADAS system in accordance with the present invention. Computer executable logic for implementing the validation system resides on one or more of the system memory 706, and the memory devices 708, 710 in accordance with certain examples. The processing unit 704 executes one or more computer executable instructions originating from the system memory 706 and the memory devices 708 and 710. The term "computer readable medium" as used herein refers to a medium that participates in providing instructions to the processing unit 704 for execution, and can, in practice, refer to multiple, operatively connected apparatuses for storing machine executable instructions.

Implementation of the techniques, blocks, steps, and means described above can be done in various ways. For example, these techniques, blocks, steps, and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on.

What is claimed is:

1. A system for sensor performance validation comprising:
   a first set of sensors positioned on a representative vehicle to provide a collective field of view defining a set of sensor locations, such that a field of view of a sensor positioned at any of the set of sensor locations is encompassed by the collective field of view of the first set of sensors and the set of sensor locations includes at least one sensor location at which no sensor of the first set of sensors is placed, the first set of sensors providing a set of master data; and
   a validation data generator configured to generate, from the set of master data, a transform function applied to the master data to provide data representing a field of view associated with any of the set of sensor locations.

2. The system of claim 1, the validation data generator comprising a machine learning model trained on the set of master data, the machine learning model being configured to receive a given sensor location from the set of sensor locations and the set of master data and provide a set of image data representing a field of view of a sensor at the given sensor location.

3. The system of claim 2, wherein the machine learning model comprises an artificial neural network.

4. The system of claim 2, further comprising a vehicle bus interface that receives vehicle metadata from one or more vehicle systems, the machine learning model being trained on the set of master data and the vehicle metadata.

5. The system of claim 4, wherein the vehicle metadata comprises one of a steering angle, a vehicle speed, a headlamp status, a GPS location, a wiper status, and a turn signal status of the representative vehicle.

6. The system of claim 1, wherein the set of sensor locations is selected to provide a collective field of view that encompasses a set of fields of view associated with expected positions of sensors for a set of vehicles represented by the representative vehicle.

7. The system of claim 1, further comprising a system control that provides a common initialization signal to each sensor of the first set of sensors and a reference sensor, such that the outputs of the first set of sensors and the reference sensor are synchronized.

8. The system of claim 7, the system control further comprising an inertial measurement unit (IMU) that generates data on vehicle dynamics at the representative vehicle.

9. A method for generating sensor validation data comprising:
- equipping a representative vehicle with a first set of sensors positioned to provide a collective field of view as a set of master data, the collective field of view defining a set of sensor locations, such that a field of view of a sensor positioned at any of the set of sensor locations is encompassed by the collective field of view of the sensor and the set of sensor locations includes at least one sensor location at which no sensor of the first set of sensors is placed;
- receiving vehicle metadata representing outputs of at least one vehicle system;
- driving the representative vehicle for a distance required for validation of a sensor system, such that each of the master data and the vehicle metadata contain data representing the entire distance required for validation; and
- training a machine learning model on the set of master data and the vehicle metadata to provide a transform function applied to the master data to provide data representing a field of view associated with any of the set of sensor locations.

10. The method of claim 9,
- receiving a sensor location of the set of sensor locations associated with a new sensor system; and
- applying the transform function to a first set of validation data from the first set of sensors to produce a set of transformed validation data associated with the received sensor location; and
- predicting an output of the new sensor system with the set of transformed validation data.

11. The method of claim 10, further comprising:
- mounting the new sensor system at the received sensor location on a new vehicle associated with the new sensor system;
- mounting a reference sensor on the new vehicle at one of the set of sensor locations other than the received sensor location;
- driving the new vehicle for a distance less than the distance required for validation to provide a first set of validation data from the reference sensor and a second set of validation data from the new sensor system;
- applying the transform function to the first set of validation data to provide validation data associated with the received sensor location;
- comparing the second set of validation data to the validation data associated with the received sensor location to provide an error value; and
- validating the new sensor system with the set of transformed validation data only if the error value meets a threshold value.

* * * * *